(12) United States Patent
Bachmann et al.

(10) Patent No.: US 12,734,749 B2
(45) Date of Patent: Sep. 15, 2026

(54) METHOD FOR ADDITIVE MANUFACTURING OF A THREE-DIMENSIONAL OBJECT

(71) Applicant: Bayerische Motoren Werke Aktiengesellschaft, Munich (DE)

(72) Inventors: Joel Bachmann, Munich (DE); Lukas Knorr, Munich (DE); Philip Obst, Kirchheim bei Muenchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 150 days.

(21) Appl. No.: 18/693,206

(22) PCT Filed: Nov. 4, 2022

(86) PCT No.: PCT/EP2022/080800
§ 371 (c)(1),
(2) Date: Mar. 19, 2024

(87) PCT Pub. No.: WO2023/099111
PCT Pub. Date: Jun. 8, 2023

(65) Prior Publication Data

US 2025/0121558 A1 Apr. 17, 2025

(30) Foreign Application Priority Data

Nov. 30, 2021 (DE) ..................... 10 2021 131 395.3

(51) Int. Cl.
*B29C 64/124* (2017.01)
*B33Y 10/00* (2015.01)
(Continued)

(52) U.S. Cl.
CPC ............ *B29C 64/124* (2017.08); *B33Y 10/00* (2014.12); *B33Y 30/00* (2014.12); *B33Y 70/10* (2020.01)

(58) Field of Classification Search
CPC ... B29C 64/124; B29C 64/129; B29C 64/135; B33Y 10/00; B33Y 30/00; B33Y 50/02
See application file for complete search history.

(56) References Cited

U.S. PATENT DOCUMENTS

2002/0185782 A1 12/2002 Koch et al.
2005/0285312 A1* 12/2005 Fury .................... B29C 39/006 264/494
(Continued)

FOREIGN PATENT DOCUMENTS

DE 10 2014 111 559 A1 2/2016
DE 10 2014 220 760 A1 4/2016
(Continued)

OTHER PUBLICATIONS

International Search Report (PCT/ISA/210) issued in PCT Application No. PCT/EP2022/080800 dated Feb. 3, 2023 with English translation (5 pages).
(Continued)

*Primary Examiner* — JaMel M Nelson
(74) *Attorney, Agent, or Firm* — Crowell & Moring LLP

(57) ABSTRACT

A method for the additive manufacturing of an item includes a step of solidifying a construction material, modifying the distribution, and solidifying the construction material. In the step of solidifying the construction material, the material is solidified in order to form at least one wall element which delimits at least one internal space. The item is a three-dimensional object formed by selective solidification of a resin-based construction material which includes at least one additive. In the step of modifying the distribution, the distribution is modified by locally increasing the concentration of the additive in the liquid construction material in the at least one delimited internal space. In the final step of
(Continued)

solidifying the construction material, the construction material is solidified in the at least one internal space.

10 Claims, 3 Drawing Sheets

(51) Int. Cl.

| | |
|---|---|
| *B33Y 30/00* | (2015.01) |
| *B33Y 70/10* | (2020.01) |

(56) References Cited

U.S. PATENT DOCUMENTS

| | | | | |
|---|---|---|---|---|
| 2006/0141276 | A1 | 6/2006 | Ito et al. | |
| 2013/0056672 | A1* | 3/2013 | Johnston | C22C 47/025 252/62.51 R |
| 2022/0105677 | A1* | 4/2022 | Wynne | B33Y 10/00 |

FOREIGN PATENT DOCUMENTS

| | | | | |
|---|---|---|---|---|
| DE | 10 2019 119 885 A1 | | 1/2021 | |
| DE | 11 2004 001 151 B4 | | 6/2021 | |
| DE | 102021117806 A1 | * | 1/2023 | B29C 64/124 |
| EP | 2 565 022 A1 | | 3/2013 | |
| EP | 2565022 B1 | * | 12/2019 | B29C 64/188 |

OTHER PUBLICATIONS

German-language Written Opinion (PCT/ISA/237) issued in PCT Application No. PCT/EP2022/080800 dated Feb. 3, 2023 with English translation (11 pages).

German-language Search Report issued in German Application No. 10 2021 131 395.3 dated Jun. 3, 2022 with partial English translation (10 pages).

* cited by examiner

METHOD FOR ADDITIVE MANUFACTURING OF A THREE-DIMENSIONAL OBJECT

BACKGROUND AND SUMMARY

The disclosure relates to a method for the additive manufacturing of a three-dimensional object by selective solidification of a resin-based construction material which comprises at least one additive.

Methods for the additive manufacturing of three-dimensional objects are widely known from the prior art. For example, a resin or a resin-based construction material, which is liquid in a basic state, may be locally solidified by selective solidification, in particular by the input of energetic radiation, in order to form constituent parts of the object.

In order to be able to achieve particular properties, in particular mechanical, electrical or thermal properties, in the component or object produced, it is known to provide the construction material with various additives. Known additives are, for example, particles or fibers which can be admixed to the liquid or resin-based construction material.

Until now, with described methods or in three-dimensional objects thereby produced, it has only been possible to achieve the properties added or sought by the additives relatively homogeneously. In other words, the object usually has the same proportion of the additive in all regions in the solidified construction material, so that no modifications of the properties sought by the additives is possible apart from the geometry of the object. If the object is for example intended to be electrically conductive in a particular region because of the additives, it is not possible to configure the object separately in another solidified region when using the same resin-based construction material for manufacturing the entire object. For this purpose, it is usually necessary to use different construction materials, in particular with different additives or different concentrations of additives, in the same production process or separate production processes. This requires either a change of the construction material or the provision of a plurality of devices which are configured to provide construction material.

Particularly in applications in which the concentration of the additive is intended to be modified over the object in a multiplicity of stages or even variably (continuously), modifying the proportion or concentration of the additive is very expensive.

The object of the disclosure is to provide a method for the additive manufacturing of a three-dimensional object, which is improved in relation thereto and in which in particular flexible modification of the additive in the resin-based construction material is possible.

This object is achieved by inventive method according to this specification. The specification also relates to possible embodiments.

As described, the disclosure relates to a method for the additive manufacturing of three-dimensional objects by selective solidification of a resin-based construction material. In the method, the resin-based construction material is solidified in order to form constituent parts or portions of the object. In other words, distinction may fundamentally be made between solidified and unsolidified or liquid construction material, those regions of the construction material which are not intended to form solid constituents of the object, or of a basic structure of the object, in the method remaining unsolidified, or liquid, in a first solidifying step. The described unsolidified regions remain in particular liquid, i.e. the construction material may remain in its basic state. The solidified regions are generally referred to as a wall element or wall elements. In principle, all solid structures of the object may be produced as such a "wall element" in a first solidifying step, regardless of their future function.

For example, the method may comprise solidifying construction material in order to form at least one wall element which delimits at least one internal space. The construction material is locally solidified selectively, for example by input of energetic radiation, in order to form the at least one wall element. The internal space may in this case be delimited by a single wall element, or a multiplicity of wall elements which delimit the internal space may be formed. The internal space may, in particular, be fully delimited by the one or more wall elements, so that the internal space may be fully enclosed.

As described, the resin-based construction material is solidified in order to form the wall element so that the unsolidified construction material present in the internal space remains in its basic state, in particular liquid. The distribution of the additive in the liquid construction material in the at least one delimited internal space may subsequently be modified, and in particular the concentration may be locally increased. After the modification of the distribution of the additive, the hitherto liquid construction material in the internal space may be solidified so that the adjusted distribution of the additive can be fixed. Fixing the distribution means, in particular, that it can no longer change over time since the liquid construction material is solidified and therefore local displacement of the additives, for example particles or fibers, in the liquid construction material is no longer possible.

In other words, the disclosure proposes to form a basic structure deliberately by a first solidification of the construction material, the at least one wall element being formed. In particular, the basic structure establishes the spatial configuration of the internal spaces in which the liquid construction material is contained. Because liquid construction material is contained in the internal space, the distribution of the additive in the liquid construction material can still be influenced. Conversely, the distribution of the additive in the solidified wall element is fixed since the wall element is rigidly formed by the solidification of construction material. In other words, the construction material forming the wall element differs by its state from the construction material in the internal space (before its solidification).

In particular, the construction material of the wall element is solidified and the construction material in the internal space is (initially) liquid, so that movement of the molecules or individual elements of the additive in the solidified construction material of the wall element is no longer possible but movement of the molecules or the individual fiber or particle constituents in the liquid construction material is still possible.

The proposed method therefore makes it possible that different distributions of the additive can be produced in different regions of the object, without having to replace the construction material used during the manufacturing process. Rather, in regions of the object in which a first distribution of the additive is intended to be produced, this is fixed by solidifying the construction material. In regions of the object in which a second distribution of the additive is intended to be produced, the desired distribution may be adjusted as desired in the liquid state of the construction material after solidification of the construction material to form the wall element. The hitherto liquid construction material inside the internal space may subsequently be solidified in order to establish the desired distribution in the internal space as well.

The individual process steps may therefore also be understood as a “first process step”, “second process step” and “third process step”. In a first process step, the construction material may be solidified in order to form the wall elements, or the at least one wall element. In the second process step, the distribution in the internal space, that is to say in the liquid construction material, may be modified. In the third process step, the adjusted distribution may be fixed by solidifying the previously liquid construction material in the internal space. The individual process steps may be carried out in parallel or overlapping in individual layers. The second and third process steps may be carried out inside the additive manufacturing apparatus or externally thereto. By the deliberate modification or adjustment of the distribution of the additive, different material properties may be produced in the object in a locally limited way, and in particular varying mechanical, thermal and electrical properties may be produced in the various regions, particularly in the internal spaces and the wall elements, in particular without replacing or changing the construction material used.

According to one development of the method, the distribution of the additive in the liquid construction material inside the at least one delimited internal space may be modified by means of at least one enrichment mechanism, in particular by sedimentation and/or centrifuging and/or a force field, in particular a magnetic field. As described, the local distribution of the additive in the liquid construction material inside the internal space which is delimited by the at least one wall element may be modified, in particular locally enriched and conversely locally depleted.

Various enrichment mechanisms may be envisioned for this, which ultimately achieve a movement of the additive in the liquid construction material, for example relative to a wall element. By the movement of the additive, for example the particles or fibers inside the matrix of the liquid construction material, the concentration of the additive may be locally increased in the internal space or in a subregion of the internal space. Since the wall element is already solidified during the modification of the distribution of the additive, the distribution of the additive in the wall element is maintained irrespective of the modification of the additive in the internal space. Particular properties of the construction material may therefore be produced only by the modification of the distribution of the additive, so that a particular region in the internal space has them and the basic structure of the object, which has been solidified as a wall element, does not have them.

In principle, it is arbitrarily possible to modify the distribution of the additive. One possibility consists in sedimentation, that is to say the particles or fibers of the additive in the liquid construction material are deposited in the internal space, in particular by the force of gravity. The distribution of the additive in the liquid construction material is thereby modified and leads to depletion in at least one subregion and enrichment in at least one subregion. The properties which are intended to be produced by the additives, in particular mechanical properties, electrical properties or thermal properties, are thereby also modified.

A further possibility for enrichment of the additive is in principle the application of an external force onto the individual elements of the additive. For example, centrifuging of the object may be used in order to accelerate the individual elements of the additive, so that a force which moves the additive inside the liquid construction material according to the centrifugal movement acts on the additive in the liquid construction material. For example, fibers or particles of the additive may thus be conveyed deliberately in a direction inside the internal space, and in particular bear on the wall element. A further possibility consists in applying a force field, in particular a magnetic field. If it is possible to magnetically influence the particles or fibers of the additive, a movement of the particles or fibers of the additive in the internal space may be achieved by a magnetic field.

As described, after the desired distribution of the additive in the liquid construction material has been adjusted in the internal space, the adjusted distribution may be fixed. The previously liquid construction material in the internal space is thereby solidified. In principle, the way in which the wall element is solidified and the construction material is solidified in the internal space after the modification of the distribution may be selected arbitrarily. According to one configuration, the construction material can be solidified in order to form the at least one wall element by means of radiation, in particular UV radiation. By the selective input of radiation, the wall element may be deliberately solidified and the construction material may be left unsolidified in the internal space to be delimited. In principle, in order to subsequently solidify the construction material in the internal space, it is possible to use the same way in which solidification of the wall element has previously taken place. It is likewise possible to select a differing mechanism for the solidification of the wall element and the solidification of the construction material in the internal space.

For example, the construction material can be solidified inside the at least one internal space by means of radiation, in particular radiation differing in at least one radiation parameter from the radiation for forming the wall element, or by means of thermal treatment, in particular heating. UV radiation or IR radiation may for example be envisioned for the solidification by means of radiation. In principle, the incident radiation can be implemented as directed, focused radiation, for example laser radiation, or the solidification can be carried out by areal irradiation, in particular by means of masking or a DLP process. For example, the construction material can be solidified by means of UV radiation in order to form the wall element and the construction material in the internal space can be solidified by means of IR radiation. It is likewise possible to solidify the construction material by irradiation in order to form the wall element and to solidify the construction material in the internal space by heating.

In principle, the construction materials in the wall element and the internal space may in this case differ by mechanical properties. According to one configuration, the construction material solidified as a wall element and the solidified construction material inside the internal space may differ in at least one mechanical parameter, in particular strength. For example, a degree of the solidification, or a solidification degree, in the wall element may be higher than in the internal space. Ultimately, the resilient or mechanical properties may be adjusted during the solidification of the construction material. For example, the wall element may be adjusted arbitrarily as a thermoset or thermoplastic, and the construction material in the internal space may be adjusted as a thermoplastic or elastomer. It is likewise possible to influence the various strengths by different hardening of the construction material.

The enriched particle concentration, which is used for example to form conductive traces, is 1-17 percent by weight of the corresponding polymer matrix. The typical conductivity thereby produced is for example $10^3$-$10^6$ S/m at a temperature of 25° C. In the other portions, the proportion by weight is correspondingly lower, in particular less than 1 wt %.

The conductivity of the particles or fibers is crucially characterized, besides the concentration, by their surface constitution, orientation and the ratio of length to diameter (L/D). Long thin particle fibers with a large L/D, which are arranged in a random orientation, are therefore preferred. The electrical conduction resulting therefrom may be used for the via contacting of printed circuit boards, various sensor applications or the modification of optical properties by energy input, in particular irradiation (smart window).

According to a further configuration of the method, a shaped element, in particular an electrical conductor, may be formed inside the internal space by the modification of the distribution of the additive, in particular accumulation of individual elements of the additive. "Individual elements" of the additive refer to the individual particles or fibers, that is to say the individual elements of the additive which are distributed in the resin-based construction material.

As described, the distribution of the individual elements of the additive inside the internal space may be modified by the enrichment. In particular, there may be enrichment or deposition, or accumulation, of the individual elements in a subregion of the internal space. In particular, a shaped element, in particular an electrical conductor, may be formed inside the internal space by the deliberate enrichment. The shaped element may, for example, form a macroscopic shaped element closed by the individual elements arranged on one another, which produces corresponding mechanical or electrical properties in the subregion. In this way, it is also possible to produce an electrical conductor formed as a shaped element, which is electrically conductive because of the enrichment of the additive and is correspondingly insulated electrically by the depletion of the surrounding construction material. The concentration of the additive may in principle be selected so that the properties sought are produced only with enrichment of the additive, in particular formation of the shaped element, while the properties sought are not produced with depletion or the construction material in the basic state.

In principle, an arbitrary distribution or configuration and geometrical arrangement may be achieved by the modification of the distribution during the formation of the shaped element. For example, an arbitrary three-dimensional arrangement of the individual elements may be produced by suitable movement of the internal space, for example centrifuging, rotation, alignment and the like. For example, a rotation, for example in an oven, may be carried out before and during the solidification of the construction material in the internal space, so that coiled or cylindrical shaped elements may also be produced.

As described, the additive may in principle be selected as a function of the properties which are intended to be produced in the object. The additive may in particular comprise at least one electrically conductive material, for example particles and/or fibers. For example, metal fibers or CFRP fibers may be envisioned as fibers. The functionality of the additive, or of the shaped element, described in relation to the electrical conductivity may in principle also be applied to the same properties in respect of thermal conductivity.

Besides the thermal and electrical properties described above, the shaped element may also influence mechanical properties, and may in particular form local stiffening of the internal space. Local stiffening may be understood as enrichment of the additive and formation of the shaped element in the otherwise less solid construction material in the internal space. For example, a "core" which causes local stiffening of the object may be formed by enrichment of the individual elements of the additive and formation of the shaped element, for example by using metal fibers or particles. For example, the construction material may be configured to be relatively soft in the internal space after solidification, and may for example form an elastomer. Although the shaped element may be movable or deformable, as a result of its solidified metal structure it can retain or restore its shape so that shaping which imparts stiffness to the entire object is in principle possible by the shaped element. The shaped element may, for example, be understood as a skeleton structure of the object.

The disclosure furthermore relates to an apparatus for the additive manufacturing of three-dimensional objects by selective solidification of a resin-based construction material which comprises at least one additive, wherein the apparatus is configured to carry out the method as described above. The apparatus has, in particular, an application device which is configured to correspondingly provide the construction material so that it can be solidified. The device furthermore has a solidifying device, which is adapted to selectively solidify the construction material in order to form the at least one wall element.

The apparatus may furthermore have a distributing device, which is configured to modify the distribution of the additive, in particular to enrich it, in the liquid construction material in the internal space. The distributing device may also be understood as optional, particularly if the distribution is modified by gravitationally induced sedimentation. The distributing device may furthermore have subsidiary devices which are configured to move, for example rotate, centrifuge, etc., the at least partially manufactured object. The distributing device may furthermore be configured to generate or apply a force field, in particular a magnetic field.

Lastly, the apparatus also has a second solidifying device, or the previously described solidifying device is also configured to solidify the construction material in the internal space. For example, the solidifying device may have a heating device which is configured to solidify the construction material in the internal space by thermal treatment. In principle, the entire description provided in relation to the method may also be applied to the apparatus. All advantages, details and features which have been described in relation to the method may be fully applied to the apparatus, and vice versa.

The disclosure is explained with the aid of exemplary embodiments with reference to the figures. The figures are schematic representations, in which:

DETAILED DESCRIPTION OF THE DRAWINGS

Figure 1:
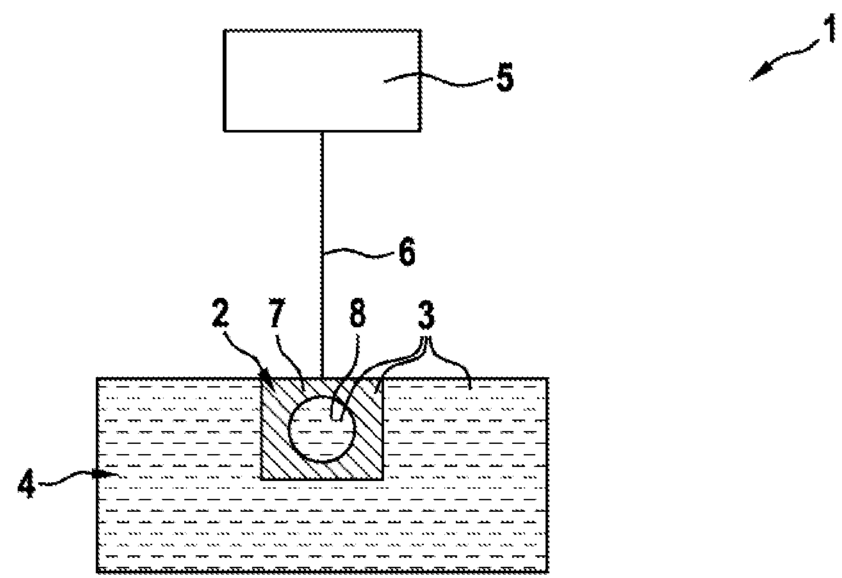
FIG. 1 shows a schematic diagram of an apparatus for the manufacturing of three-dimensional objects.
Figure 1:

FIG. 1 shows a schematic representation of an apparatus 1 which is configured for the additive manufacturing of a three-dimensional object 2, or in general three-dimensional objects 2. The three-dimensional object 2 manufactured is to be understood merely by way of example. In principle, the three-dimensional object 2 manufactured may have arbitrary shapes, sizes, cross sections and geometries.

The apparatus 1 has an application device (not represented in further detail), which is configured to provide resin-based construction material 3, for example in a construction container or a construction volume 4. The apparatus 1 furthermore has a solidifying device 5, which is configured to selectively solidify the construction material 3. Merely by way of example, an energy beam 6 is represented, for example a laser beam, in particular a UV laser, which can be guided over the surface of the construction material 3 in order to introduce energy or selectively solidify the construction material 3, as described. In principle, the configuration of the solidifying device 5 may be selected arbitrarily, and it may for example generate solidification by means of radiation.

A wall element 7, which delimits an internal space 8 of the object 2, may be generated by the selective solidification. In principle, a multiplicity of wall elements 7 which delimit the same internal space 8 or different internal spaces 8 may be generated. For the sake of simplicity, the functionality of the method described herein will be described with the aid of one wall element 7, which fully encloses an internal space 8. As may be seen, the wall element 7 provides the internal space 8 with its shaping, so that liquid construction material 3 which is contained in the internal space 8 is held in the internal space 8.

Figure 2:
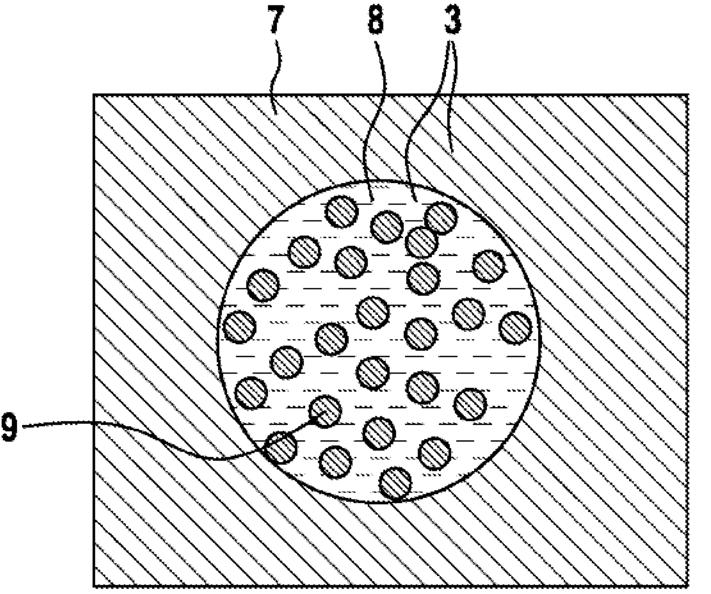
FIG. 2 shows a schematic diagram of a three-dimensional object in a processing step of a method for the manufacturing of three-dimensional objects.

By the solidification of the construction material 3 in order to manufacture the wall element 7, the construction material 3 is therefore converted from a liquid basic state into a solid state. The construction material 3 in the wall element 7 thereby differs from the construction material 3 in the internal space 8, which is still liquid after solidification of the wall element 7. By way of example, FIG. 2 represents a schematically enlarged representation of the internal space 8 and of the wall element 7 surrounding the internal space 8. The construction material 3 has an additive, the individual elements 9 of which are represented by way of example as particles. The individual elements 9 may in principle arbitrarily be particles, fibers or have any other forms. The individual elements 9, for example particles or fibers, are distributed in the liquid construction material 3, in particular uniformly or statistically, as additive.

By the solidification of the construction material 3 in order to form the wall element 7, the uniform distribution of the additive is fixed since the individual elements 9 can no longer move inside the wall element 7 but are locally constrained because of the solidified structure. For the sake of clarity, the individual elements 9 in the wall element 7 are not represented. Conversely, the individual elements 9 are freely mobile in the internal space 8 because of the liquid state of the construction material 3 in the internal space 8.

Figure 3:
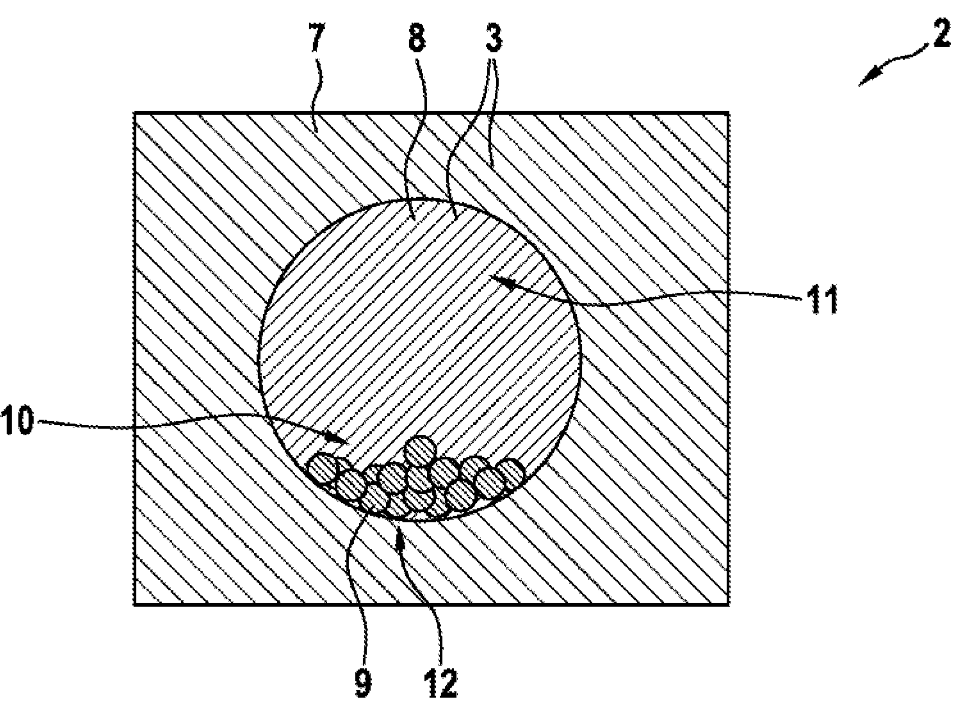
FIG. 3 shows a schematic diagram of a three-dimensional object in a processing step of a method for the manufacturing of three-dimensional objects.

This allows modification of the distribution of the individual elements 9, that is to say in general of the additive in the internal space 8. According to a first exemplary embodiment, which is shown in FIG. 3, a local enrichment, that is to say in particular a concentration increase, may be achieved in a subregion 10 of the internal space 8. A surrounding subregion 11 is thereby correspondingly depleted since the individual elements 9 "migrate" into the subregion 10. Various enrichment mechanisms may be envisioned, which are represented merely by way of example in FIG. 3 and FIG. 4, 5. For this purpose, any enrichment mechanisms which are configured to move the individual elements 9 inside the internal space 8 are suitable in principle. In particular, mechanisms which move the individual elements 9 through the liquid construction material 3 and allow defined arrangement of the individual elements 9 may be envisioned.

FIG. 3 represents that the individual elements 9 are deposited by sedimentation, for example induced by gravity, in the internal space 8. In relation to a subregion 11, enrichment therefore takes place in the subregion 10 so that the subregion 11 is depleted. In other words, there is a concentration increase of the additive in the subregion 10 and a reduction in the concentration of the additive in the subregion 11. Depending on the enrichment mechanism, an arbitrary distribution of the individual elements 9 may in this case be produced. The modification of the distribution of the additive is always limited to the internal space 8, or the internal spaces 8, since as described the (uniformly or statistically distributed) positions of the individual elements 9 of the additive are already established in the wall element 7, which ultimately defines a base body of the object 2.

The individual elements 9 may together form a shaped element 12, which may for example be used as an electrical conductor or stiffening element inside the internal space 8. After the desired distribution of the additive, or the positions of the individual elements 9, have been achieved, the construction material 3 in the internal space 8 may be solidified as shown in FIG. 3.

The solidification of the liquid construction material 3 in the internal space 8 may in principle be selected arbitrarily. In the exemplary embodiment shown, a thermal treatment device of the apparatus 1, which is not represented in further detail and is for example configured as an oven, may be used to solidify the construction material 3 in the internal space 8 by the action of heat. The degrees of hardening of the construction material 3 arranged in the internal space 8 and of the construction material 3 of the wall element 7 may be different. In particular, the wall element 7 may be stronger than the construction material 3 in the internal space 8 after solidification. In particular, the wall element 7 may be a thermoset or a thermoplastic and the solidified construction material 3 in the internal space 8 may be a thermoplastic or an elastomer.

As described, the shaped element 12 may form an electrical conductivity in the internal space 8. It is likewise possible for the shaped element 12 to determine mechanical properties of the object 2, for example acting as a stiffening element or as a stiff "core".

Figure 4:
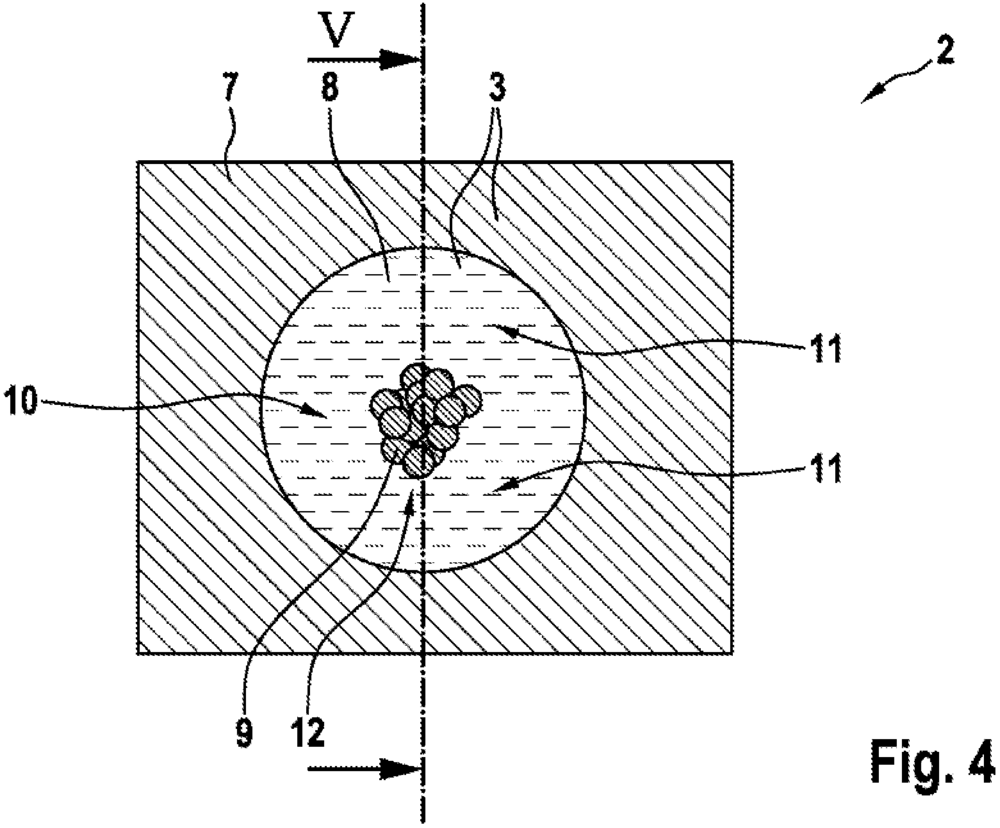
FIG. 4 shows a schematic diagram of a three-dimensional object in a processing step of a method for the manufacturing of three-dimensional objects.
Figure 5:
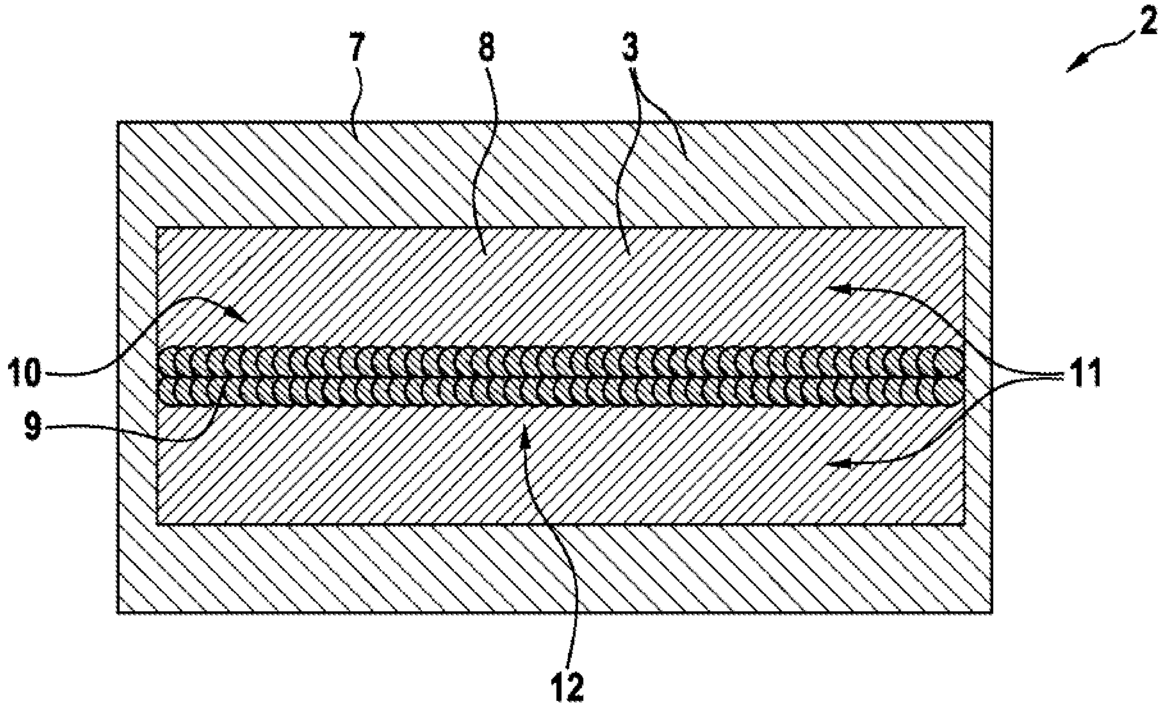
FIG. 5 shows a schematic diagram of a three-dimensional object in a processing step of a method for the manufacturing of three-dimensional objects.

FIG. 4, 5 represent a further form of the enrichment, in which the distribution of the additive in the internal space 8 is achieved by a force field, in particular a magnetic field. For this purpose, a corresponding shaped element 12, which is configured for example in the form of a rod, may be formed in a subregion 10, particularly in the inner region of the internal space 8, for example in its middle. In a longitudinal section through the shaped element 12, which is represented in FIG. 5, it is represented that it may extend through the internal space 8, or through the object 2. The shaping of the shaped element 12 may in principle be selected arbitrarily. The apparatus 1 may have a movement device which is configured to move the object 2, for example to generate a particular distribution of the individual elements 9 by centrifuging. As described, when the desired distribution is reached, the construction material 3 in the internal space 8 may subsequently be solidified so as to fix the adjusted distribution.

The advantages, details and features presented in the individual exemplary embodiments may be arbitrarily combined with one another, replaced with one another and applied to one another.

LIST OF REFERENCE SIGNS

1 apparatus
2 object
3 construction material
4 construction volume
5 solidifying device
6 energetic radiation
7 wall element
8 internal space
9 individual element
10, 11 subregion
12 shaped element

What is claimed is:

1. A method for the additive manufacturing of an item, the method comprising:

a first step of solidifying a liquid construction material, wherein the liquid construction material is a resin-based construction material, in order to form at least one wall element which delimits at least one internal space, wherein the item is a three-dimensional object formed by selective solidification of the liquid construction material, and wherein the liquid construction material includes at least one additive;

a second step, after the first step, of modifying the distribution by locally increasing the concentration of the at least one additive in the liquid construction material in the at least one internal space; and a third step, after the second step, of solidifying the liquid construction material in the at least one internal space.

2. The method according to claim 1, wherein the distribution of the at least one additive in the liquid construction material inside the at least one delimited internal space is modified via at least one enrichment mechanism selected from sedimentation or centrifuging.

3. The method according to claim 1, wherein the construction material is solidified in order to form the at least one wall element via radiation, wherein the radiation includes UV radiation.

4. The method according to claim 3, wherein the construction material is solidified inside the at least one internal space via radiation differing in at least one radiation parameter from the radiation for forming the at least one wall element, or via heating.

5. The method according to claim 4, wherein the construction material solidified as the at least one wall element and the solidified construction material inside the at least one internal space differ in at least one mechanical parameter, wherein the at least one mechanical parameter is strength.

6. The method according to claim 1, wherein a shaped element, different from the item, is formed inside the at least one internal space by the modification of the at least one additive, including accumulation of the individual elements of the at least one additive.

7. The method according to claim 6, wherein a concentration of the at least one additive is 1-17 wt % in the region of the shaped element and less than 1 wt % in the rest of the at least one internal space and/or there is a higher electrical conductivity in the region of the shaped element than in the rest of the at least one internal space.

8. The method according to claim 1, wherein the additive comprises at least one electrically conductive material selected from particles and fibers.

9. The method according to claim 6, wherein the shaped element forms a local stiffening of the at least one internal space.

10. The method according to claim 2, wherein the at least one enrichment mechanism is selected from a force field or a magnetic field.

* * * * *